United States Patent [19]
Hershey et al.

[11] Patent Number: 5,526,488
[45] Date of Patent: Jun. 11, 1996

[54] DYNAMIC SWITCHING SYSTEM FOR SWITCHING BETWEEN EVENT DRIVEN INTERFACES IN RESPONSE TO SWITCHING BIT PATTERN INCLUDING IN DATA FRAME IN A DATA COMMUNICATIONS NETWORK

[75] Inventors: Paul C. Hershey, Manassas, Va.; Raymond F. Daugherty, Mt. Airy; John G. Waclawsky, Frederick, both of Md.

[73] Assignee: International Business Machines Corporation, Armonk, N.Y.

[21] Appl. No.: 188,168

[22] Filed: Jan. 26, 1994

[51] Int. Cl.$^6$ ............................. G06F 13/00; G06F 13/14
[52] U.S. Cl. ........................... 395/200.2; 395/200.11; 395/200.15; 395/800; 370/54; 364/240.8; 364/242.96; 364/DIG. 1
[58] Field of Search ................. 370/60, 54; 395/700, 395/800, 200.11, 200.2, 200.15

[56] References Cited

U.S. PATENT DOCUMENTS

| | | | |
|---|---|---|---|
| 4,227,245 | 10/1980 | Edbland et al. | 364/468 |
| 4,458,309 | 7/1984 | Wilder, Jr. | 395/183.06 |
| 4,459,656 | 7/1984 | Wilder, Jr. | 395/550 |
| 4,521,849 | 6/1985 | Wilder, Jr. | 395/183.06 |
| 4,779,194 | 10/1988 | Jennings et al. | 395/650 |
| 4,805,089 | 2/1989 | Lane et al. | 364/188 |
| 4,851,998 | 7/1989 | Hospodor | 364/580 |
| 4,905,171 | 2/1990 | Kiel et al. | 364/551.01 |
| 4,939,724 | 7/1990 | Ebersole | 370/85.5 |
| 4,944,038 | 7/1990 | Hardy et al. | 370/85.5 |
| 4,980,824 | 12/1990 | Tulpule et al. | 395/650 |
| 5,035,302 | 7/1991 | Thangavelu | 187/382 |
| 5,062,055 | 10/1991 | Chinnaswamy et al. | 364/551.01 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,212,793 | 5/1993 | Donica et al. | 395/700 |
| 5,287,537 | 2/1994 | Newmark et al. | 395/800 |
| 5,327,559 | 7/1994 | Priven et al. | 395/700 |
| 5,440,547 | 8/1995 | Easki et al. | 370/60 |

FOREIGN PATENT DOCUMENTS 61-53855   3/1986   Japan.

Primary Examiner—Thomas C. Lee
Assistant Examiner—Le Hien Luu
Attorney, Agent, or Firm—John D. Flynn; John E. Hoel

[57] ABSTRACT

A system is disclosed for the dynamic switching between a first Event Driven Interface and a second Event Driven Interface based upon inband information contained in the data frames of a data communications network. This enables the selective realtime transfer of routing control based upon diverse communications protocols, for example. A first routing table can be contained in a first Event Driven Interface and a second routing table can be embodied in a second Event Driven Interface, and in this example, by means of the first Event Driven Interface identifying the switchover pattern contained within a switching segment of the data frame, the system can automatically switch over to connect a second Event Driven Interface to the data communications network, containing a second routing table configuration. In this manner, realtime control of routing, for example, can be accomplished with inband information in a data communications network.

4 Claims, 3 Drawing Sheets

FIG. 2
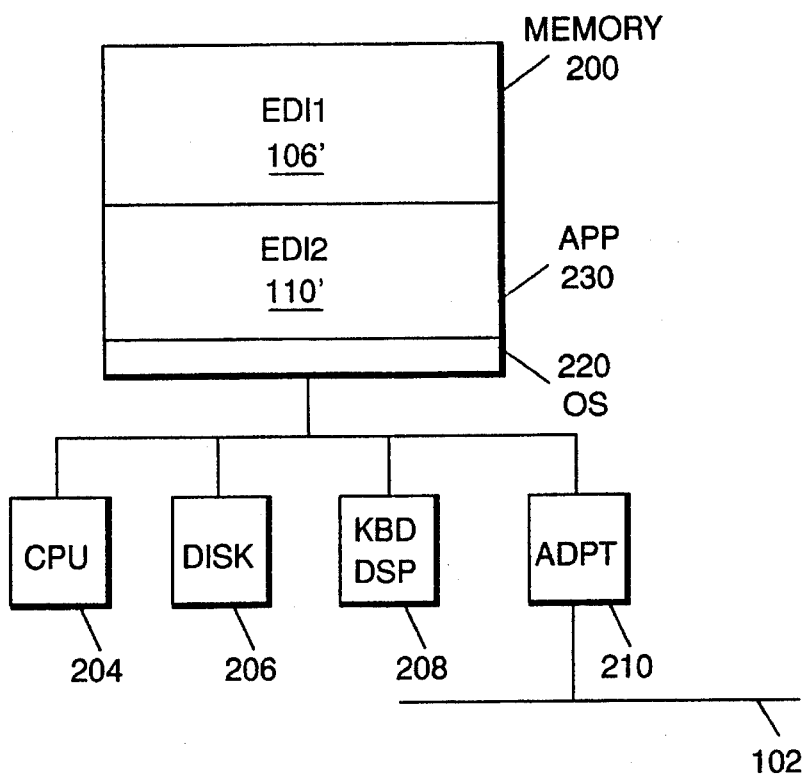
FIG. 4A
FIG. 4B
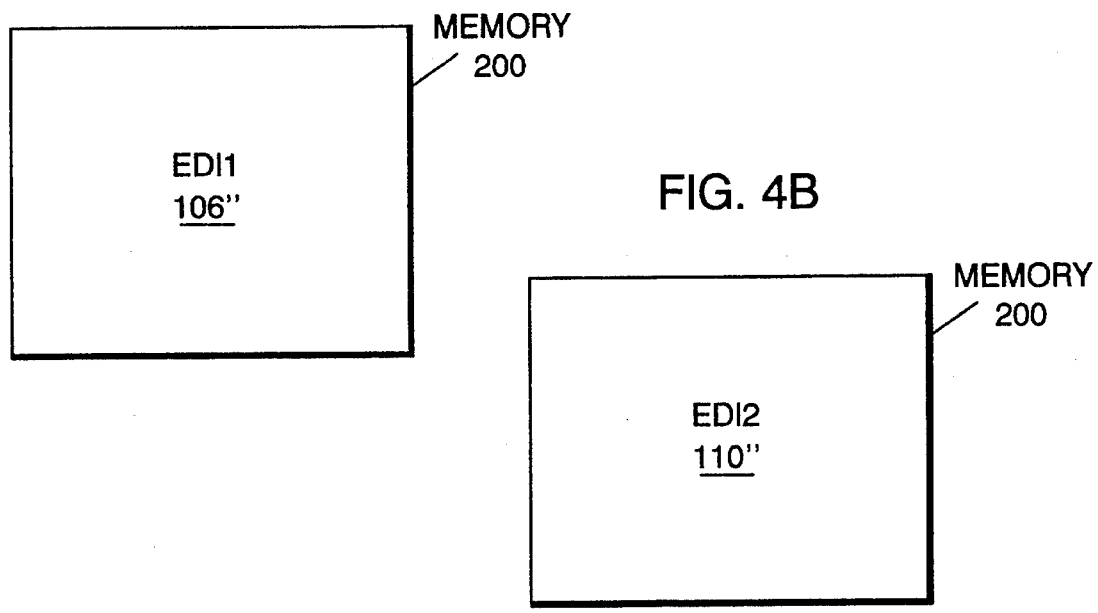

DYNAMIC SWITCHING SYSTEM FOR SWITCHING BETWEEN EVENT DRIVEN INTERFACES IN RESPONSE TO SWITCHING BIT PATTERN INCLUDING IN DATA FRAME IN A DATA COMMUNICATIONS NETWORK

BACKGROUND OF THE INVENTION

1. Technical Field

The invention disclosed broadly relates to the extraction of information from large bodies of data for high speed communication facilities, and more particularly relates to the dynamic switching between a first Event Driven Interface and a second Event Driven Interface based upon inband information.

2. Related Patent Applications

The invention disclosed herein is related to the patent application Ser. No. 08/024,575 now U.S. Pat. No. 5,365,314, filed Mar. 1, 1993 entitled "Event Driven Interface for a System for Monitoring and Controlling a Data Communications Network" by P. C. Hershey, et al., assigned to the IBM Corporation and incorporated herein by reference.

This patent application is related to the U.S. patent application Ser. No. 08/024,572 now U.S. Pat. No. 5,375,070, filed Mar. 1, 1993, entitled "Information Collection Architecture and Method for a Data Communications Network," by J. G. Waclawsky, et al., assigned to the IBM Corporation and incorporated herein by reference.

This patent application is also related to the copending U.S. patent application Ser. No. 08/024,563 now pending, filed Mar. 1, 1993, entitled "Event Driven Interface for a System for Monitoring and Controlling a Data Communications Network," by P. C. Hershey, et al., assigned to the IBM Corporation and incorporated herein by reference.

This patent application is also related to the U.S. patent application, Ser. No. 08/024,542 now U.S. Pat. No. 5,493,689, filed Mar. 1, 1993, entitled "System and Method for Configuring an Event Driven Interface and Analyzing Its Output for Monitoring and Controlling a Data Communications Network," by J. G. Waclawsky, et al., assigned to the IBM Corporation and incorporated herein by reference.

This patent application is also related to the copending U.S. patent application Ser. No. 08/138,045 now pending, filed Oct. 15, 1993, entitled "System and Method for Adaptive, Active Monitoring of a Serial Data Stream Having a Characteristic Pattern," by P. C. Hershey, et al., assigned to the IBM Corporation and incorporated herein by reference.

BACKGROUND INFORMATION

The Event Driven Interface described in the above cited Hershey, et al. patent application, is a mechanism which is programmed by control vectors to recognize bit patterns in a serial bit stream. The Event Driven Interface has a plurality of logic paths which are defined to recognize bit patterns and output corresponding enabling signals as each bit patterns is recognized. The Event Driven Interface also includes a counter coupled to the outputs of the logic paths, to count the respective events which are recognized. There are many applications, such as network routing, which depend upon diverse protocols and control bit patterns for their implementation. It would be useful to enable alternate Event Driven Interfaces which are programmed to recognize alternate bit patterns for alternate protocols in a data communications network, with the capability of switching between the respective Event Driven Interfaces being accomplished by inband information in the data communications network.

OBJECTS OF THE INVENTION

It is therefore an object of the invention to switch between a first Event Driven Interface and a second Event Driven Interface using inband information.

SUMMARY OF THE INVENTION

These and other objects, features and advantages are accomplished by the invention disclosed herein. The invention includes a plurality of Event Driven Interface mechanisms, each having an input coupled to the data communications network. The data frames communicated over the data communications network include a switching field such as a switching header, having a bit pattern which characterizes which of several Event Driven Interfaces are desired to be invoked for pattern recognition. In accordance with the invention, a first Event Driven Interface will have at least one of its preprogrammed logic paths capable of identifying the switching header command to switch to a second Event Driven Interface. The first Event Driven Interface will output an enabling signal in response to the detection of the switching header, to a gate enabling the second Event Driven Interface to be coupled to the data communications network. In this manner, inband information on the data communications network can be used to switch from a first Event Driven Interface to a second Event Driven Interface. This can be useful for example, if the first Event Driven Interface is programmed to handle a first routing table for a first protocol and the second Event Driven Interface is programmed to handle a second routing table for a second protocol.

In an alternate embodiment of the invention, instead of having separate random access memory embodiments for two separate Event Driven Interfaces which are selectively switched between using the switching header, a single random access memory can have two different portions of it programmed, the first portion being programmed with a first set of control vectors for the first Event Driven Interface and the second portion being programmed with a second set of control vectors for a second Event Driven Interface.

A second alternate embodiment of the invention can have a single random access memory which is programmed with a first set of control vectors for the first Event Driven Interface. When the first Event Driven Interface identifies the bit pattern for the switching header indicating that it is desired to invoke the second Event Driven Interface, an enabling signal is output from the first Event Driven Interface to load the second set of control vectors for the second Event Driven Interface, the second set of control vectors overwriting the programmed state of the first Event Driven Interface in the random access memory. The second set of control vectors are read into the random access memory, and configure the second Event Driven Interface, which then performs pattern recognition of the serial bit streams on the network.

DESCRIPTION OF THE FIGURES

These and other objects, features and advantages will be more fully appreciated with reference to the accompanying figures.

FIG. 2 is an architectural diagram of a communication processing node in the data communication network 102.

FIG. 4A and FIG. 4B show an alternate embodiment of the invention where the first Event Driven Interface and the second Event Driven Interface can occupy the same partition of the memory 200.

DISCUSSION OF THE PREFERRED EMBODIMENT

Figure 1:
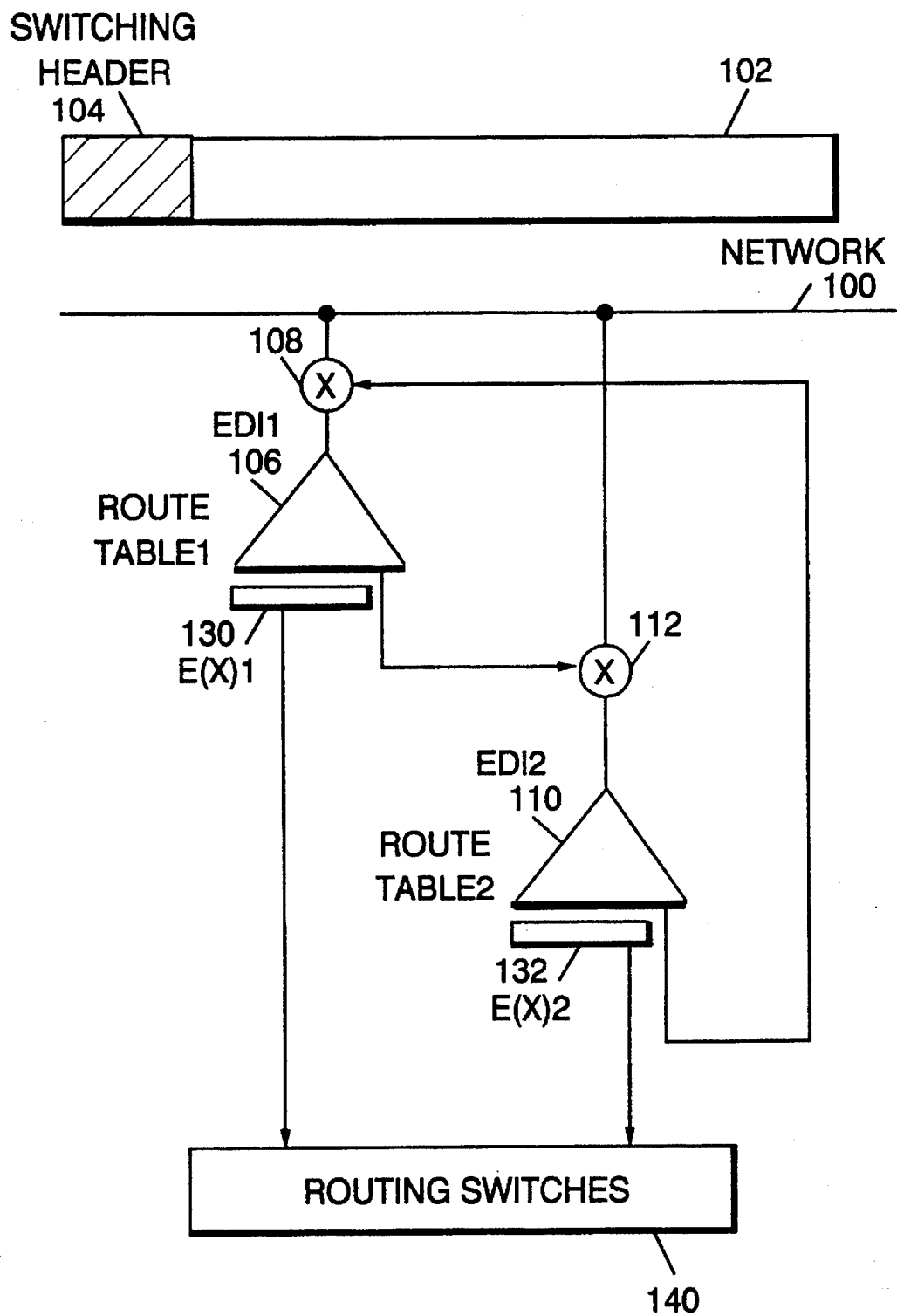
FIG. 1 illustrates a functional block diagram of the invention, including first and second Event Driven Interfaces which are selectively coupled to the data communications network.

This invention uses the event driven interface (EDI) which is described in the patent application Ser. No. 8/024,575 now U.S. Pat. No. 5,365,314 by P. C. Hershey, et al. The event driven interface is a logic tree whose input is connected to a serial bit stream, and which has a plurality of outputs, each output corresponding to a distinct pattern of binary bits which may appear on the serial bit stream. As is described in the copending patent application, the EDI is normally embodied in a random access memory.

The invention provides for the dynamic switching between a first event driven interface logic tree which performs a first routing scenario and a second event driven logic tree which performs a second routing scenario. The serial data stream will include a switching header which will be input along with the rest of the serial data stream into the active EDI logic tree. The switching header will be recognized by the active EDI as commanding a switchover to a standby EDI logic tree.

The switchover from the active EDI to the standby EDI can either be through overwriting the old active EDI with a new data pattern for the standby EDI in the RAM, or alternately it can be the readdressing of the input serial bit stream to a second partition in the RAM where the standby EDI is stored. In the second embodiment, both of the EDI logic trees can remain resident in the RAM simultaneously. In this way, packets can be identified and routed on criteria embedded in one tree or the other.

The outputs of the EDIs can be used for a variety of purposes as has been described previously for related patent applications and disclosures by the above inventors. For example, the outputs of the EDIs can be used to control a routing multiplexer which dynamically routes the input data stream so that individual packets are individually routed to one of a plurality of output destinations.

In application of this invention, if there is a change in protocol or other routing change such as a change in the location of recipients in the network, then the standby EDI can be commanded to take over from the active EDI, thereby implementing the changed routing patterns. If necessary we can flip-flop between Event Driven Interfaces to route by one criteria and then another for one or more packets in the data stream. There are two embodiments for this invention, the inband switching where a load packet: is a part of the input data stream and invokes the Event Driven Interface changeover. A second approach is the out of band where a separate entity, such as an expert system, can invoke the switchover from a first EDI to a second EDI.

In the inband embodiment, it is necessary to separate the loading of the standby EDI logic tree from the invocation or switching-in of the standby into an active mode. This is done by providing both a load packet in the input data stream and a following switch packet. The following switch packet may be separated by many minutes or hours in time of occurrence from the occurrence of the preceding load packet. The invention is not limited to merely an active EDI and one standby EDI. There may be first, second, third and fourth standby EDIs, and the load packet can specify which of the standby EDIs is designated as the next active EDI, which will be invoked or switched into operation at the time of occurrence of the switch packet.

FIG. 1 shows a block diagram of the invention. FIG. 1 shows the data communications network 100 which communicates data frames such as the data frame 102. The data frame 102 will include a switching header 104 which contains a bit pattern which will direct the switchover from a first Event Driven Interface to a second Event Driven Interface. Also shown in FIG. 1 is the first Event Driven Interface 106 which is selectively connected through the gate 108 to the network 100. Also shown in FIG. 1 is a second Event Driven Interface 110 which is selectively connected through the gate 112 to the network 100. In accordance with the invention, configuration vectors have programmed the first Event Driven Interface 106 to recognize the bit pattern of the switching header 104 in the serial bit stream on the network 100, and through designated branch of the logic tree in the EDI 106, will provide an output on line 120 as a switching input to the gate 112. The switching header 104 will designate that a switchover is intended from the first EDI 106 to the second EDI 110, for example to transfer from a first routing table contained in the EDI 106, to a second routing table contained in the EDI 110. In accordance with the invention, the gate 112 is thereby enabled through the signal on line 120, and connects the second EDI 110 to the network 100. In this manner, an inband signal contained in the switching header 104, can be used to switch from a first Event Driven Interface 106 to a second Event Driven Interface 110. An example application is the change from a first routing table associated with a first communications protocol to a second routing table for a second communications protocol, as is embodied in the programmed EDI 110. The EDI 110 has been programmed with a set of control vectors to recognize bit patterns in the serial bit stream which are associated with the second communications protocol, for the purpose of performing routing operations.

Routing operations are performed by outputting the event vector 130 from the first EDI 106 or alternately by outputting the event vector 132 from the second EDI 110, to appropriate path routing devices contained in the communications network 100. The second EDI 110 is also programmed to recognize an appropriate bit pattern in the switching header 104, to switch back to the EDI 106.

Other applications for the Event Driven Interface switchover can include alternative forms of customer billing, for example the first Event Driven Interface can be programmed to bill according to rate of activity of the user's sending node in the data communications network, whereas alternately the user may be billed by the number of bytes he transmits, the routine of which would be programmed or configured into the second Event Driven Interface. Thus, the billing procedure could be switched in realtime based upon the user's identity as determined in the data frame. The user's identity field would therefore be the switchover segment which, when identified in the first Event Driven Interface, would cause a switchover to the second Event Driven Interface, thereby changing the form of billing as was agreed to for the user whose identity is in that particular data frame.

In some applications such as the routing application shown in the example of FIG. 1, the event vector 130 or 132 is actually a single signal or signal configuration which can be applied to routing switches 140 in the data communications network. Alternately, if the application is a billing application such as the second example mentioned above, then an actual accumulated count would be desired of the number of data frames transmitted by a user, for example. In this second example application, the event vectors 130 and 132 will be the accumulated counts of events which have been identified by the respective Event Driven Interfaces 106 and 110.

FIG. 2 shows a second embodiment of the invention contained within a processing node of the data communications network. The processing node shown in FIG. 2 includes the memory 200 which is connected by means of the bus 202 to the CPU 204, disk drive 206, keyboard and display 208 and communications adapter 210 which is connected to the data communications network 102. Within the memory 200, two Event Driven Interface configurations have been written using two sets of control vectors. The first. Event Driven Interface 106' is shown in an upper partition and the second Event Driven Interface 110' is shown in a lower partition of the memory 200. Also included in the memory 200 can be the operating system 220 and application programs 230, as appropriate.

Figure 3:
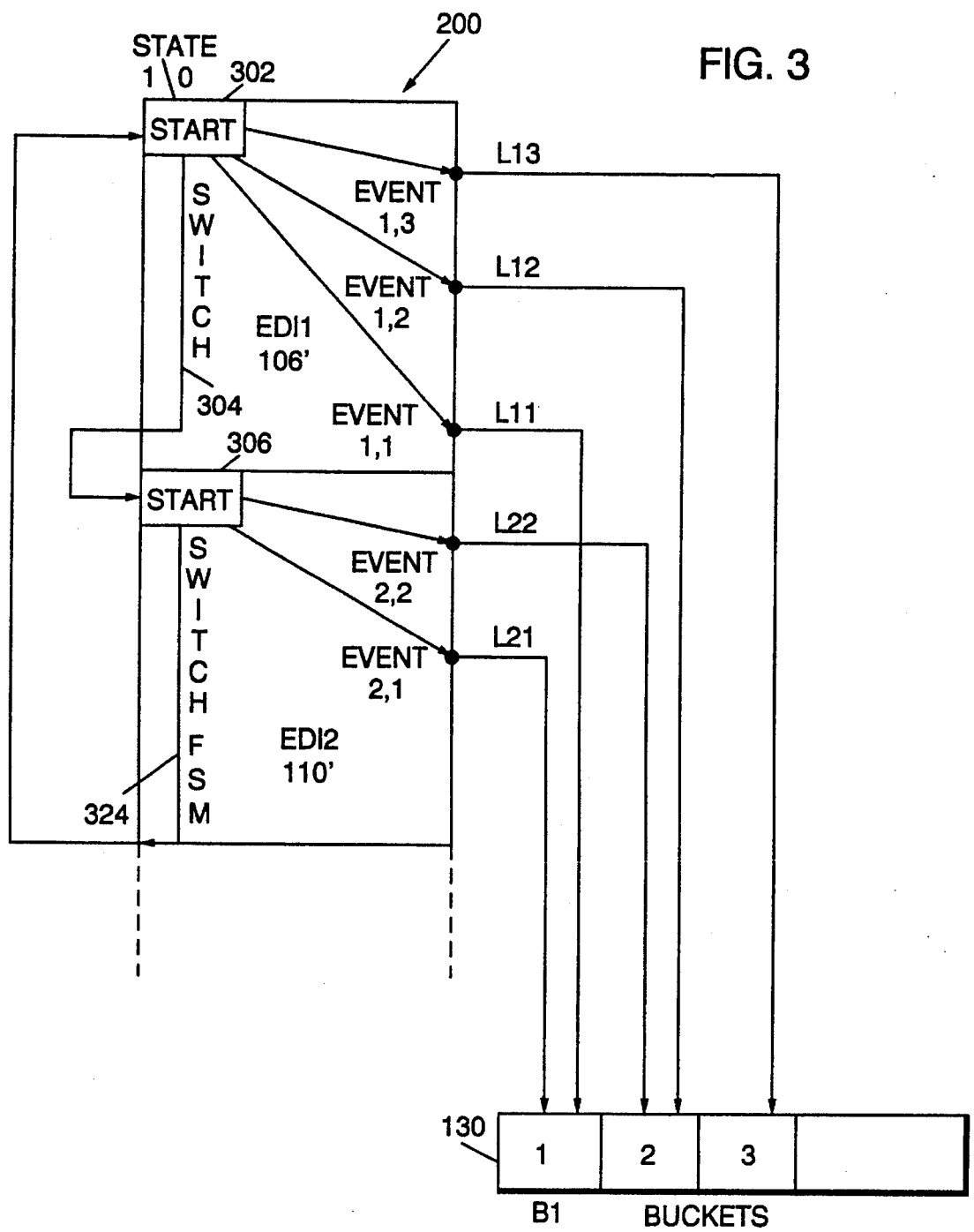
FIG. 3 is a detailed illustration of the memory 200 for the processing node of FIG. 2.

Turning now to FIG. 3, a more detailed illustration of the memory 200 of FIG. 2 is shown. In the memory 200 of FIG. 3, it can be seen that the first Event Driven Interface 106' has been configured in the upper part of the memory 200 and the second Event Driven Interface 110' has been configured in the lower part of the memory 200. Also configured into the memory can be the counters for the event vector 130, which will be the counter used for the outputs of both the first Event Driven Interface 106' and the second Event Driven Interface 110'.

The first Event Driven Interface 106' includes a switching header of bit pattern recognition logic 302 which is the point at which the identification of the existence of a switching header and the interpretation of the state of the switching header is performed. In this example, the switching segment is considered to be contained within the switching header of the data frame 102. However, the switching information can be contained anywhere within the data frame 102 if the data frame is buffered long enough so that the switching segment can be applied to the logic 302 to perform the appropriate interpretation of the switching information. In this example, the bit pattern of the switching header 104 is interpreted in the logic 302 and if the switching header is either absent or indicates that the first Event Driven Interface 106' is to be used, then the logic paths contained within the upper portion of the memory 200 for the Event Driven Interface 106' are employed to interpret the pattern of bits in the serial bit stream of this particular data frame 102. Alternately, if the switching header 104 is identified and interpreted in the logic 302 as indicating that the second Event Driven Interface 110' is to be employed for this particular data frame 102, then the path 304 is followed in FIG. 3 to pass the serial bit stream to the second switching header bit pattern identifying logic 306 at the beginning of the second Event Driven Interface 110'.

Consider in this first example that the switching header 104 indicates that the first Event Driven Interface 106' is to be employed. Then, if there are three candidate logic paths in the Event Driven Interface 106', illustrated as event 1,1; event 1,2; and event 1,3, then the serial bit stream will begin its propagation down these respective logic paths in the first Event Driven Interface 106'. Eventually as the bit stream is propagated down these three respective logic paths, one or more of these logic paths will not be satisfied and the propagation will terminate for that particular logic path. When one of the logic paths is successful in conducting the bit stream completely through it to its terminating point, then it is considered that that logic path has been satisfied and the Event Driven Interface 106' will output an enabling signal or a count signal over one of the lines L11, L12 or L13 to the event vector counters 130. For example, if only the event 1,1 is satisfied in the Event Driven Interface 106', then an enabling signal or a count signal will be output over the line L11 to the bucket B1 in the event vector counter 130.

Alternately, if the switching header contains information indicating that the second Event Driven Interface 110' is desired to be used for this particular data frame 102, then the serial bit stream will be passed over path 304 to the second switching header bit pattern identifying logic 306 at the beginning of the second Event Driven Interface 110'. There, the logic paths which have been configured within the second Event Driven Interface 110' will propagate the serial bit stream through them until it completes the traverse of the logic path or it is stopped in the logic path. Two logic paths are shown in the second Event Driven Interface 110', event 2,1 and event 2,2. In this alternate example, if the first event 2,1 has its serial bit stream completely traverse it, then an enabling signal or count signal is output over the line L21 to the bucket B1 for the event vector counter 130. The event vector formulated in the event vector counter 130 for this alternate example, reflects the outputs from the second Event Driven Interface 110'.

When the next data frame is received off the data communications network 100 by the second Event Driven Interface 110' in the memory 200 of FIG. 3, if the switching header bit pattern indicates that it is the first Event Driven Interface 106' which is to be used for the second occurring data frame, as identified by the second switching header bit pattern identifying logic 306, then the serial bit stream will be propagated over the path 324 which will follow up to the input of the first switching header bit pattern identifying logic 302 for the first Event Driven Interface 106'. In this manner, inband switching between the first Event Driven Interface 106' and the second Event Driven Interface 110' can be accomplished with two Event Driven Interface configurations programmed simultaneously into the same random access memory 200.

FIG. 4A and FIG. 4B show an alternate embodiment of the invention where the first Event Driven Interface 106" can occupy a partition of the memory 200 and when it is desired to switch to the second Event Driven Interface 110", a part or all of the first Event Driven Interface configuration 106' in the memory 200 is overwritten by the configuration for the second Event Driven Interface 110" in the memory 200.

Although a specific embodiment of the invention has been disclosed, it will be understood by those having extraordinary skill in the art that changes can be made to that specific embodiment without departing from the spirit and the scope of the invention.

What is claimed is:

1. In a system for monitoring and controlling a data communications network which communicates a serial bit stream of binary bits having a characteristic pattern, including a data frame having a switching segment, a dynamic switch for switching between a first Event Driven Interface and a second Event Driven Interface based upon inband information in said switching segment, comprising:

a first Event Driven Interface having an input coupled to said data communications network, said first Event Driven Interface programmed with a first plurality of logic paths, each logic path defined to identify a characteristic pattern and for outputting an event vector in response to identifying a characteristic pattern in said serial bit stream, with at least one logic path programmed to identify a first switching bit pattern in said switching segment and outputting a first enabling signal when said first switching bit pattern is identified;

a second Event Driven Interface having an input coupled to said data communications network, said second Event Driven Interface programmed with a second plurality of logic paths, each logic path defined to identify a characteristic pattern and for outputting an event vector in response to identifying a characteristic pattern in said serial bit stream, with at least one logic path programmed to identify a second switching bit pattern in said switching segment and outputting a second enabling signal when said second switching bit pattern is identified;

a first gate coupled between said data communications network and said first Event Driven Interface, having a control input coupled to said second enabling signal output from said second Event Driven Interface, for selectively connecting said first Event Driven Interface to said data communications network;

a second gate coupled between said second Event Driven Interface and said data communications network, having a control input coupled to said first enabling signal output from said first Event Driven Interface, for selectively connecting said second Event Driven Interface to said data communications network;

said first Event Driven Interface identifying said first switching bit pattern and outputting said first enabling signal to said second gate, thereby selectively coupling said second Event Driven Interface to said data communications network in response to inband information contained in said switching segment.

2. The system of claim 1 wherein said first Event Driven Interface is embodied in a first random access memory and said second Event Driven Interface is embodied in a second random access memory.

3. The system of claim 1 wherein said first Event Driven Interface is embodied in a first partition of a random access memory and said second Event Driven Interface is embodied in a second partition of said random access memory.

4. The system of claim 1 which further comprises:

said first Event Driven Interface being a programmed configuration of control vectors in a random access memory and said second Event Driven Interface being a second programmed configuration of second control vectors in said random access memory, at least partially overwriting said first Event Driven Interface in said random access memory.

* * * * *